(12) United States Patent
Secatch et al.

(10) Patent No.: US 10,142,304 B2
(45) Date of Patent: Nov. 27, 2018

(54) ENCRYPTION KEY SHREDDING TO PROTECT NON-PERSISTENT DATA

(71) Applicant: SEAGATE TECHNOLOGY LLC, Cupertino, CA (US)

(72) Inventors: Stacey Secatch, Longmont, CO (US); Kristofer C. Conklin, Burnsville, MN (US); Dana L. Simonson, Owatonna, MN (US); Robert W. Moss, Windsor, CO (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 156 days.

(21) Appl. No.: 15/245,051

(22) Filed: Aug. 23, 2016

(65) Prior Publication Data
US 2018/0063102 A1    Mar. 1, 2018

(51) Int. Cl.
| | |
|---|---|
| *H04L 29/06* | (2006.01) |
| *G06F 12/0802* | (2016.01) |
| *G06F 12/14* | (2006.01) |
| *G06F 1/32* | (2006.01) |
| *G06F 1/24* | (2006.01) |
| *H04L 9/08* | (2006.01) |

(52) U.S. Cl.
CPC .......... *H04L 63/061* (2013.01); *G06F 1/24* (2013.01); *G06F 1/3287* (2013.01); *G06F 12/0802* (2013.01); *G06F 12/1408* (2013.01); *G06F 2212/1052* (2013.01); *G06F 2212/205* (2013.01); *G06F 2212/402* (2013.01); *H04L 9/0891* (2013.01); *H04L 63/0435* (2013.01); *H04L 63/068* (2013.01)

(58) Field of Classification Search
CPC . H04L 63/061; H04L 9/0891; H04L 63/0435; H04L 63/068; G06F 1/3287; G06F 12/1408; G06F 12/0802; G06F 1/24; G06F 2212/1052; G06F 2212/402; G06F 2212/205
See application file for complete search history.

(56) References Cited

U.S. PATENT DOCUMENTS

| | | | |
|---|---|---|---|
| 7,082,539 B1 * | 7/2006 | Kitahara | G06F 21/71 713/189 |
| 7,886,364 B2 | 2/2011 | Douceur et al. | |
| 8,301,908 B2 * | 10/2012 | Masui | G06F 21/6209 380/44 |

(Continued)

Primary Examiner — Matthew Smithers
(74) Attorney, Agent, or Firm — Holland & Hart LLP

(57) ABSTRACT

Systems and methods for encryption key shredding to protect non-persistent data are described. In one embodiment, the storage system device may include a storage drive and a controller. In some embodiments, the controller may be configured to power on the storage drive, identify an encryption key on the storage drive created upon powering on the storage drive, and encrypt data in a cache of the storage drive using the encryption key. In some embodiments, the controller may be configured to power off the storage drive and delete the encryption key upon powering off the storage drive. In some cases, the storage drive may include at least one of a solid state drive and a hard disk drive. In some embodiments, the storage drive may include a hybrid storage drive that includes both a solid state drive and a hard disk drive.

20 Claims, 6 Drawing Sheets

(56) References Cited

U.S. PATENT DOCUMENTS

| | | | | |
|---|---|---|---|---|
| 8,332,604 B2* | 12/2012 | Mangold | ................ | G06F 12/02 |
| | | | | 711/164 |
| 8,788,849 B2 | 7/2014 | Hahn et al. | | |
| 9,367,697 B1* | 6/2016 | Roth | ................ | G06F 21/602 |
| 9,720,700 B1* | 8/2017 | Brown | ................ | G06F 9/4411 |
| 2009/0271619 A1* | 10/2009 | Fujii | ................ | G06F 21/78 |
| | | | | 713/164 |
| 2012/0011305 A1* | 1/2012 | Mikami | ................ | G06F 21/608 |
| | | | | 711/103 |
| 2012/0093318 A1* | 4/2012 | Obukhov | ................ | G06F 21/6209 |
| | | | | 380/277 |
| 2012/0254623 A1* | 10/2012 | Sathath | ................ | G06F 21/602 |
| | | | | 713/183 |
| 2012/0260349 A1* | 10/2012 | Nagai | ................ | G06F 21/44 |
| | | | | 726/28 |

* cited by examiner

ENCRYPTION KEY SHREDDING TO PROTECT NON-PERSISTENT DATA

SUMMARY

The present disclosure is directed to methods and systems for encryption key shredding to protect non-persistent data. In some embodiments, the present systems and methods may retain data on a storage drive in relation to a data retention policy and encrypt the data. In some cases, the data retention policy may specify an expiration for one or more encryption keys used to encrypt the data.

A storage system for encryption key shredding to protect non-persistent data is described. In one embodiment, the storage system device may include a storage drive and a controller. In some embodiments, the controller may be configured to power on the storage drive, identify an encryption key on the storage drive created upon powering on the storage drive, and encrypt data in a cache of the storage drive using the encryption key. In some embodiments, the controller may be configured to power off the storage drive and delete the encryption key upon powering off the storage drive. In some cases, the storage drive may include at least one of a solid state drive and a hard disk drive. In some embodiments, the storage drive may include a hybrid storage drive that includes both a solid state drive and a hard disk drive.

In some embodiments, the controller may be configured to receive the encryption key from a host of the storage drive. In some cases, the host may create the encryption key upon powering on the storage drive and send the created encryption key to the storage drive. In some embodiments, the controller may be configured to create the encryption key on the storage drive. In some cases, the storage drive may be configured via the host to create the encryption key upon powering on the storage drive.

In some embodiments, the controller may be configured to delete the encryption key upon resetting the storage drive. In some cases, the resetting of the storage drive may include at least one of power cycling the storage drive, reinitializing firmware on the storage drive, and reinitializing a software process on the storage drive.

In some embodiments, the controller may be configured to initiate a first process on the storage drive cache and create a first process encryption key upon initiating the first process on the storage drive cache. In some embodiments, the controller may be configured to initiate a second process on the storage drive cache, create a second process encryption key, and delete the first process encryption key upon initiating the second process. In some cases, at least one of the first process and the second process may include a process initialized by the host. In some configurations, the process initialized by the host may include the host writing data to the storage drive cache.

In some embodiments, the controller may be configured to designate a time of expiration for an expiring encryption key associated with data saved to the storage drive cache. In some embodiments, the controller may be configured to identify a lapsing of the expiration time and delete the expiring encryption key upon identifying the lapsing of the expiration time.

An apparatus for encryption key shredding to protect non-persistent data is also described. In one embodiment, the apparatus may include a processor, memory in electronic communication with the processor, and instructions stored in the memory, the instructions being executable by the processor to power on the storage drive, identify an encryption key on the storage drive created upon powering on the storage drive, and encrypt data in a cache of the storage drive using the encryption key. In some embodiments, the controller may be configured to power off the storage drive and delete the encryption key upon powering off the storage drive. In some cases, the storage drive may include at least one of a solid state drive and a hard disk drive. In some embodiments, the storage drive may include a hybrid storage drive that includes both a solid state drive and a hard disk drive.

A method for encryption key shredding to protect non-persistent data is also described. In one embodiment, the method may include powering on the storage drive, identifying an encryption key on the storage drive created upon powering on the storage drive, and encrypting data in a cache of the storage drive using the encryption key. In some embodiments, the method may include powering off the storage drive and delete the encryption key upon powering off the storage drive. In some cases, the storage drive may include at least one of a solid state drive and a hard disk drive. In some embodiments, the storage drive may include a hybrid storage drive that includes both a solid state drive and a hard disk drive The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
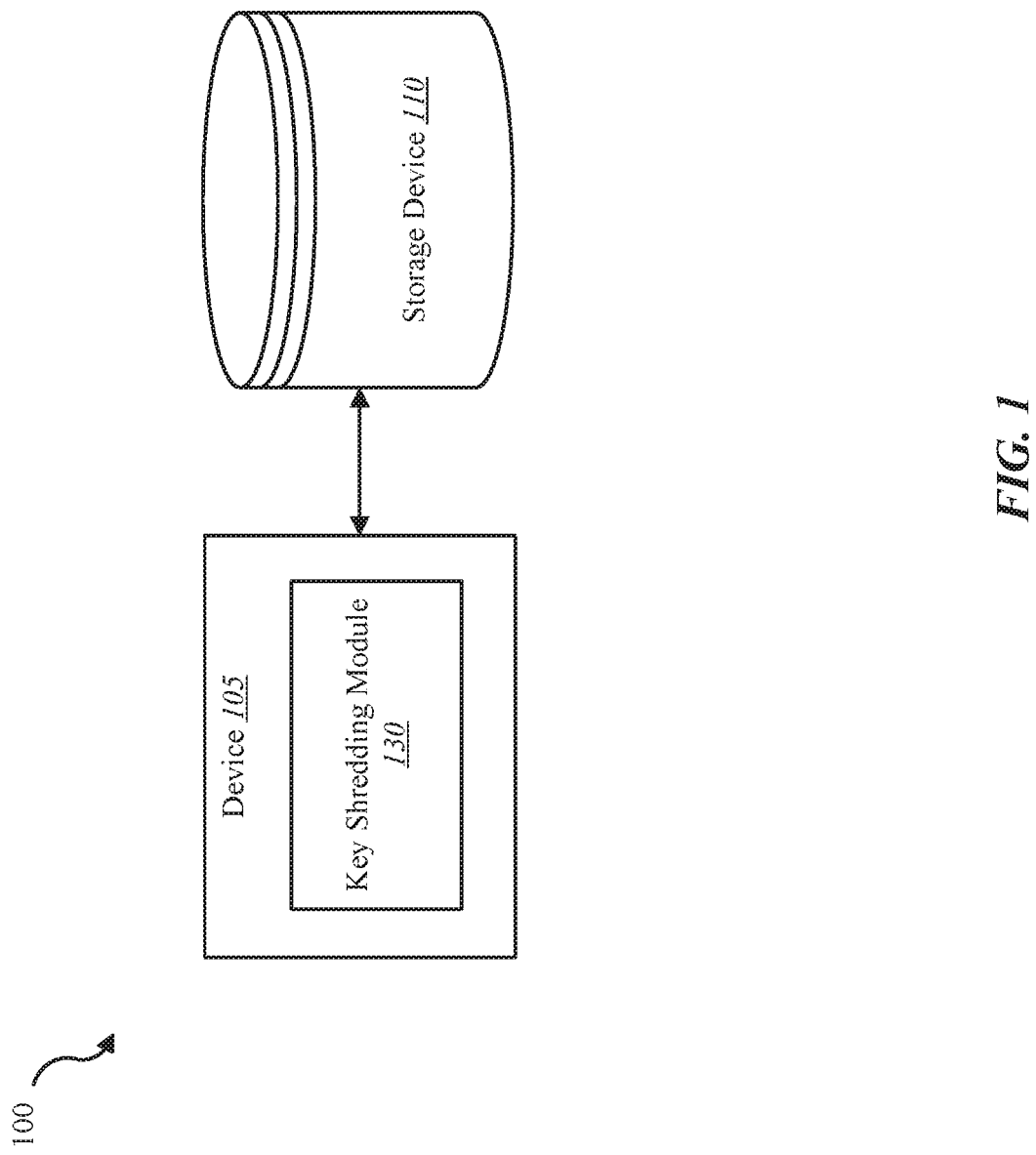
FIG. 1 is a block diagram of an example of a system in accordance with various embodiments.

The following relates generally to encryption key shredding to protect non-persistent data. In one embodiment, the present systems and methods may be associated with a storage drive automatically invalidating data based on one or more data storage policies associated with one or more storage drives.

A storage drive may be configured to generate an encryption key. The encryption key may be used to encrypt data on the storage drive. In some embodiments, an encryption key may be stored in a key registry of a storage drive. In some cases, a root user may delete, remove, and/or destroy the encryption key. In some cases, an encryption key may be permanently deleted. The data encrypted by the encryption key may be made inaccessible by deleting and/or destroying the encryption key. In some cases, deleting an encryption key from a key registry may ensure that any data encrypted with the key being deleted is unreadable.

In some embodiments, one or more encryption keys may be allocated automatically through exchange between a storage drive and a host of the storage drive. Additionally, or alternatively, one or more encryption keys may be generated and stored in a registry of a storage drive at the time the storage drive is being configured by a root user. Additionally, or alternatively, one or more keys may be generated by the storage drive based on a request by an end user of the storage drive.

In some cases, drive banding may be configured when a root user configures the storage drive. In some embodiments, a drive cache may be configured in conjunction with configuring the drive banding. In some configurations, a drive cache may be configured on a storage medium of a storage drive. For example, a storage cache may be configured on a hard disk of a hard disk drive and/or on flash memory of a solid state drive. Additionally, or alternatively, a drive cache may be configured on a storage chip separate from a storage medium of a storage drive.

In some embodiments, a host of a storage drive may perform one or more write operations to write data to a cache of the storage drive. In some cases, data written to a cache of the storage drive may be written to a storage medium of the storage drive after being written to the cache by a host of the storage drive. In some cases, a write operation may include writing the data written to the cache to a storage medium. In some embodiments, at least some data written to a cache of a storage drive may be operated on resulting in new data. In some cases, the data written to the cache that is operated on and/or the resultant new data may be stored on a storage medium of the storage drive.

In one embodiment, an encryption key may be generated for a write operation performed by a host of a storage drive. In some cases, an encryption key may be generated for each write operation performed by a host of a storage drive. For example, a first encryption key may be generated for a first write operation. Data associated with the first write operation may be encrypted using the first encryption key. A second encryption key may be generated for a second write operation, and so forth. In some embodiments, data associated with a second write operation may be encrypted using a second encryption key. In some cases, a second write operation may be initiated after a first write operation is completed. In one embodiment, a first encryption key may be deleted in relation to completing a first write operation and/or in relation to initiating a second write operation. In some embodiments, a first encryption key may be deleted after completing a first write operation, upon generating or after generating a second encryption key, upon initiating or after initiating a second write operation, or any combination thereof.

In one embodiment, one or more encryption keys may be generated each time a storage drive powers on. In some cases, one or more encryption keys may be deleted and/or destroyed. In one embodiment, an encryption keys may be used to encrypt non-persistent data on the storage drive. When this encryption key is deleted and/or destroyed, the encrypted non-persistent data may be automatically invalidated as this data is inaccessible without the encryption key to decrypt it. Accordingly, in some embodiments, a process may automatically delete the invalidated non-persistent data. In some cases, one or more encryption keys may be deleted and/or destroyed when a storage drive is powered off. Accordingly, in some embodiments, one or more encryption keys may be generated upon powering on a storage drive. At least one of the one or more encryption keys may be used to encrypt data such as non-persistent data, and upon powering off the storage drive the one or more encryption keys may be deleted/destroyed, making the data encrypted by the one or more encryption keys invalid and/or inaccessible.

In some cases, a user may specify that certain data is not to be stored past a certain time. For example, a data policy may specify certain data is to be inaccessible after a certain time. In one embodiment, a first time period encryption key may be generated for a first time period, a second time period encryption key may be generated for a second time period, etc. As one example, the first time period may start at t0 and go to t1, and the second time period may go from t1 to t2, and so forth. In one embodiment, the first time period encryption key may be created before t0, at t0, or after t0. In some cases, data associated with operations performed between t0 and t1 may be encrypted using the first time period encryption key.

Upon reaching t1 or after reaching t1, the first time period encryption key may be destroyed and/or deleted. After destroying/deleting the first time period encryption key, the data encrypted using the first time period encryption key may be made invalid and/or inaccessible. In some cases, the storage drive may delete this invalid/inaccessible data. In some embodiments, the second time period encryption key may be created before t1, at t1, or after t1. In some cases, data associated with operations performed between t1 and t2 may be encrypted using the second time period encryption key.

Upon reaching t2 or after reaching t2, the second time period encryption key may be destroyed and/or deleted. After destroying/deleting the second time period encryption key, the data encrypted using the second time period encryption key may be made invalid and/or inaccessible. In some cases, the storage drive may delete this invalid/inaccessible data. In some embodiments, a third time period encryption key may be generated for a third time period t2 to t3, and so forth. In some embodiments, two or more encryption keys may be generated per time period. In one embodiment, at the conclusion of a time period at least one of the two or more encryptions keys may be destroyed/deleted. In some embodiments, one or more time periods may overlap. In some cases, each time period may be independently initiated and terminated. Thus, as one example, a first time period with one or more first time period encryption keys may overlap a second time period with one or more second time period encryption keys, either of which may overlap a third time period with one or more third time period encryption keys, and so forth.

FIG. 1 is a block diagram illustrating one embodiment of an environment 100 in which the present systems and methods may be implemented. The environment may include a device 105 and a storage device 110. The storage device 110 may include any combination of hard disk drives, solid state drives, and hybrid drives that include both hard disk and solid state drives. In some embodiments, the systems and methods described herein may be performed on a single device such as device 105. In some cases, the methods described herein may be performed on multiple storage devices or a network of storage devices. Examples of device 105 include a storage server, a storage enclosure, a storage controller, storage drives in a distributed storage system, storage drives on a cloud storage system, storage devices on personal computing devices, storage devices on a server, or any combination thereof. In some configurations, device 105 may include a key shredding module 130. In one example, the device 105 may be coupled to storage device 110. In some embodiments, the device 105 and storage device 110 may be components of flash memory or solid state drive. Alternatively, device 105 may be a component of a host of the storage device 110 such as an operating system, host hardware system, or any combination thereof.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, or any combination thereof. In one example, device 105 may be operable to receive data streams, store and/or process data, and/or transmit data from, to, or in conjunction with one or more local and/or remote computing devices.

The device 105 may include a database. In some cases, the database may be internal to device 105. In some embodiments, storage device 110 may include a database. Additionally, or alternatively, the database may include a connection to a wired and/or a wireless database. Additionally, as described in further detail herein, software and/or firmware (for example, stored in memory) may be executed by a processor of device 105. Such software and/or firmware executed on the processor may be operable to cause the device 105 to monitor, process, summarize, present, and/or send a signal associated with the operations described herein.

In some embodiments, storage device 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and cellular networks (using 3G and/or LTE, for example), or any combination thereof. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage device 110 may be internal to device 105. As one example, device 105 may include a storage controller that interfaces with storage media of storage device 110. In some embodiments, key shredding module 130 may monitor the creation, use, and destruction of encryption keys in relation to one or more storage devices. For example, key shredding module 130 may monitor encryption keys in relation to data stored on storage device 110. Further details regarding key shredding module 130 are disclosed below.

Figure 2:
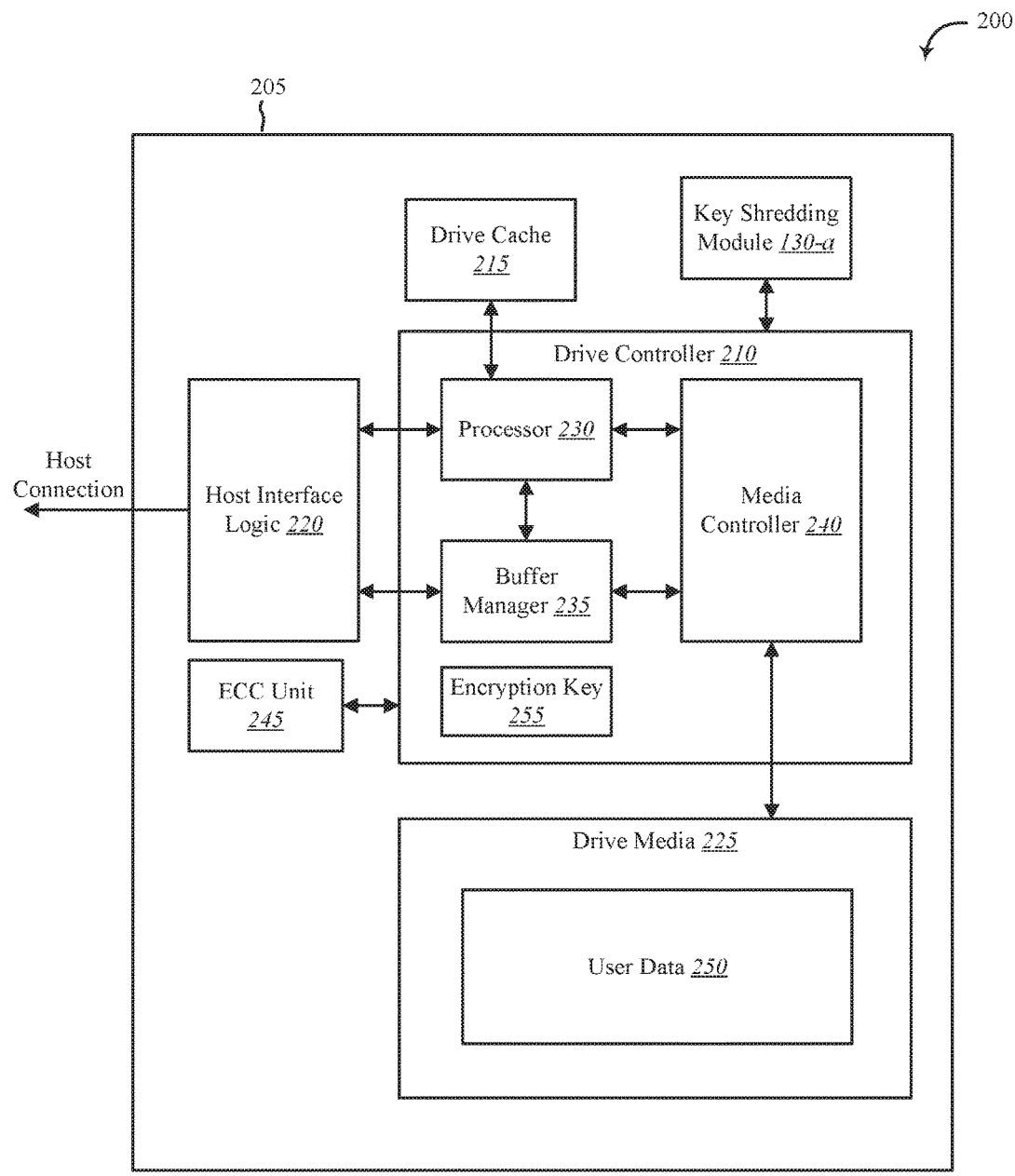
FIG. 2 shows a block diagram of a device or apparatus in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, drive cache 215, host interface logic 220, drive media 225, error correction code (ECC) unit 245, and key shredding module 130-a. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used such as Structured/Platform ASICs, Field Programmable Gate Arrays (FPGAs), and other custom ICs, which may be programmed in any manner known in the art. The functions of each module may also be implemented—in whole or in part—with instructions embodied in memory formatted to be executed by one or more general and/or application-specific processors.

In one embodiment, the drive controller 210 may include a processor 230, a buffer manager 235, media controller 240, and one or more encryption keys 255. The drive controller 210 may process, via processor 230, read and write requests in conjunction with the host interface logic 220, the interface between the apparatus 205 and the host of apparatus 205. The drive cache 215 may hold data temporarily for internal operations of apparatus 205. For example, a host may send data to apparatus 205 with a request to store the data on the drive media 225. The driver controller 210 may process the request and store the received data in the drive media 225. In some cases, a portion of data stored in the drive media 225 may be copied to the drive cache 215 and the processor 230 may process or modify this copy of data and/or perform an operation in relation to this copy of data held temporarily in the drive cache 215. In some cases, ECC unit 245 may perform error correction on data stored in drive media 225.

Although depicted outside of drive controller 210, in some embodiments, key shredding module 130-a may include software, firmware, and/or hardware located within other components such as drive cache 215, host interface logic 220, ECC unit 245, drive controller 210, and/or drive media 225. For example, key shredding module 130-a may include at least a portions of processor 230, buffer manager 235, and/or media controller 240. In one example, key shredding module 130-a may include one or more instructions executed by processor 230, buffer manager 235, and/or media controller 240. In one example, the key shredding module 130-a may be configured to identify data received from a host of a storage drive and encrypt the received data using one or more encryption keys located in apparatus 205 such as the one or more encryption keys 255. In one embodiment, at least some of the one or more encryption keys 255 may be programmed into drive controller 210 by a manufacturer of apparatus 205 and/or an end user of apparatus 205. Additionally, or alternatively, key shredding module 130-a may create at least some of the one or more encryption keys 255. In some embodiments, a host of apparatus 205 such as an operating system may be configured to create at least some of the one or more encryption keys 255.

Figure 3:
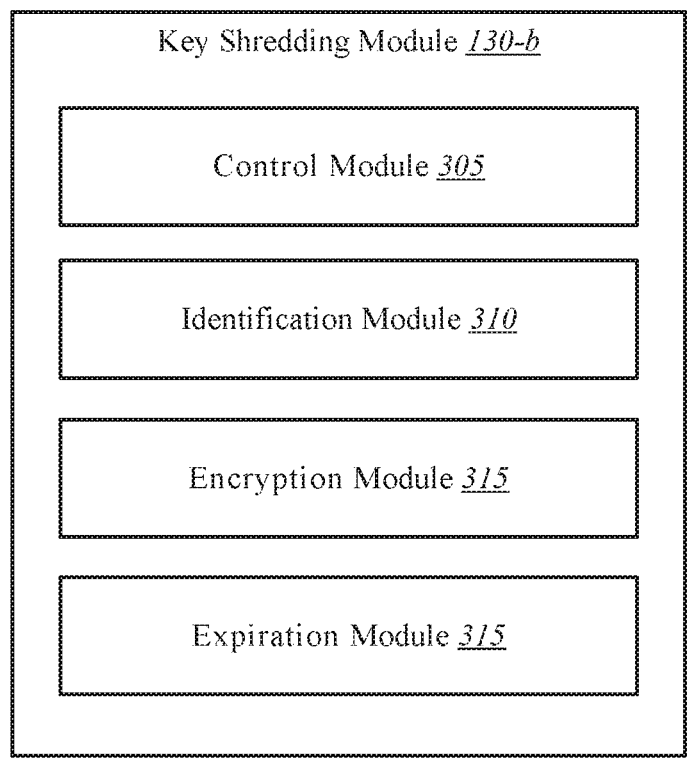
FIG. 3 shows a block diagram of one or more modules in accordance with various aspects of this disclosure.

FIG. 3 shows a block diagram of a key shredding module 130-b. The key shredding module 130-b may include one or more processors, memory, and/or one or more storage devices. The key shredding module 130-b may include control module 305, identification module 310, encryption module 315, and expiration module 320. The key shredding module 130-b may be one example of key shredding module 130 of FIGS. 1 and/or 2. Each of these components may be in communication with each other.

In one embodiment, the key shredding module 130 may perform one or more operations in conjunction with a storage system. The storage system may include one or more storage drives. In some embodiments, key shredding module 130 may perform one or more operations described herein on one or more storage drives. The storage system may include a cloud storage system, a distributed storage system, one or more storage servers, one or more storage enclosures, or any combination thereof.

In one embodiment, control module 305 may be configured to power on a storage drive. In some cases, the storage drive may include at least one of a solid state drive and a hard disk drive. For example, the storage drive may include a hybrid drive with solid state storage media and hard disk storage media. In some embodiments, the control module 305 may power on one or more storage drives.

In some embodiments, identification module 310 may be configured to identify an encryption key on the storage drive. In some cases, control module 305 may be configured to receive the encryption key from a host of the storage drive. In some configurations, the host may create the encryption key in response to the control module 305 powering on the storage drive. In some cases, the host may create at least one new encryption key every time the storage drive is powered on. In some cases, the host may send one or more encryption keys to the storage drive after creating the one or more encryption keys.

In some embodiments, encryption module 315 may be configured to create an encryption key on the storage drive. In some configurations, encryption module 315 may create one or more encryption keys. In some embodiments, encryption module 315 may be configured via the host to create one or more encryption keys. In some cases, the encryption module 315 may be configured to create an encryption key in response to the control module 305 powering on the storage drive. In some embodiments, encryption module 315 may create one or more encryption keys each time the storage drive is powered on. Thus, in some embodiments, after control module 305 powers on a storage drive, control module 305 may receive one or more encryption keys created by the host of the storage drive and additionally or alternatively, encryption module 315 may create one or more encryption keys.

In some embodiments, encryption module 315 may be configured to encrypt data using one or more encryption keys. As explained above, the one or more encryption may be created by the host of the storage drive and/or one or more encryption keys created by the encryption module 315. In some embodiments, encryption module 315 may be configured to use an encryption key to encrypt data in a cache of the storage drive.

In some embodiments, control module 305 may be configured to power off the storage drive. In one embodiment, control module 305 may receive a command to power off the storage drive. In some cases, control module 305 may receive a command to power off the storage drive from the host of the storage drive. In some configurations, control module 305 may initiate the command to power off the storage drive. Upon receiving and/or initiating the command to power off the storage drive, control module 305 may perform one or more operations. In one configuration, control module 305 may be configured to delete at least one encryption key after receiving and/or initiating the command to power off the storage drive. For example, control module 305 may be configured to delete one or more encryptions keys created by the host of the storage drive and/or delete one or more encryption keys created internal to the storage drive such as encryption keys created by the control module 305.

In some embodiments, control module 305 may delete one or more encryption keys each time the storage drive is powered off. In one embodiment, control module 305 may delete each encryption key that was created since the storage drive last powered on. For example, after control module 305 powers on a storage drive, one or more encryption keys may be created by the host of the storage drive and/or by the control module 305, and upon determining the storage drive is being powered off control module 305 may delete at least one of the one or more encryption keys created after the storage drive was powered on.

In some embodiments, control module 305 may be configured to delete the encryption key upon determining that the storage drive is being reset. In some configurations, the control module 305 may determine to reset the storage drive. For example, control module 305 may initiate a command to reset the storage drive. Additionally, or alternatively, control module 305 may receive a command to reset the storage drive from a host of the storage drive. In some configurations, resetting the storage drive may include at least one of power-cycling the storage drive, reinitializing firmware on the storage drive, reinitializing one or more software process on the storage drive, or any combination thereof. In some cases, reinitializing firmware and/or one or more software processes may be performed without powering off the storage drive.

In some embodiments, control module 305 may be configured to initiate a process on a storage drive. In some cases, control module 305 may initiate a process in relation to a cache of a storage drive. In some cases, control module 305 may be configured to initiate several processes on a storage drive. In some cases, one or more of these processes may be performed in relation to a cache of a storage drive. In some configurations, one or more of the processes may include a process to read, write, and/or erase data to a cache of a storage drive. In one embodiment, at least one of the processes initiated by the control module 305 may include a process initialized in conjunction with a host of the storage drive. For example, in some embodiments, the host of the storage drive may send a command to the control module 305 on the storage drive to initiate a process and upon receiving the command from the host the control module 305 may initiate the process. In some embodiments, the control module 305 may initiate the process at the host and send the command to the storage drive to perform the process.

In one embodiment, control module 305 may initiate a first process in relation to data on a cache of a storage drive. In some embodiments, encryption module 315 may be configured to create a first process encryption key in relation to the control module 305 initiating the first process. In one embodiment, encryption module 315 may encrypt data on the storage drive cache using the first process encryption key.

In some embodiments, control module 305 may be configured to initiate a second process in relation to the storage drive cache. In some cases, encryption module 315 may be configured to create a second process encryption key. In one embodiment, encryption module 315 may create a second process encryption key in relation to the control module 305 initiating the second process. After creating the second process encryption key, in some embodiments, encryption module 315 may encrypt data on the storage drive cache using the second process encryption key.

In some embodiments, control module 305 may be configured to delete and/or destroy the first process encryption key upon initiating the second process. Without the first process encryption key, the encryption module 315 may be unable to decrypt the data from the storage drive cache that was encrypted using the first process encryption key. Thus, in some embodiments, data encrypted using the first process encryption key may be made inaccessible and/or indecipherable after the first process encryption key is deleted and/or destroyed.

In one embodiment, encryption module 315 may create an expiring encryption key. In some embodiments, encryption module 315 may encrypt data associated with a storage drive using the expiring encryption key. In some cases, expiration module 320 may associate an expiration time with the expiring encryption key. In some embodiments, expiration module 320 may be configured to designate an expiration time for the expiring encryption key. In some cases, the expiring encryption key may be associated with data saved to a cache of the storage drive. In some embodiments, expiration module 320 may be configured to identify a lapsing of the expiration time. In some cases, control module 305 may be configured to delete the expiring encryption key upon the lapsing at the expiration time.

Figure 4:
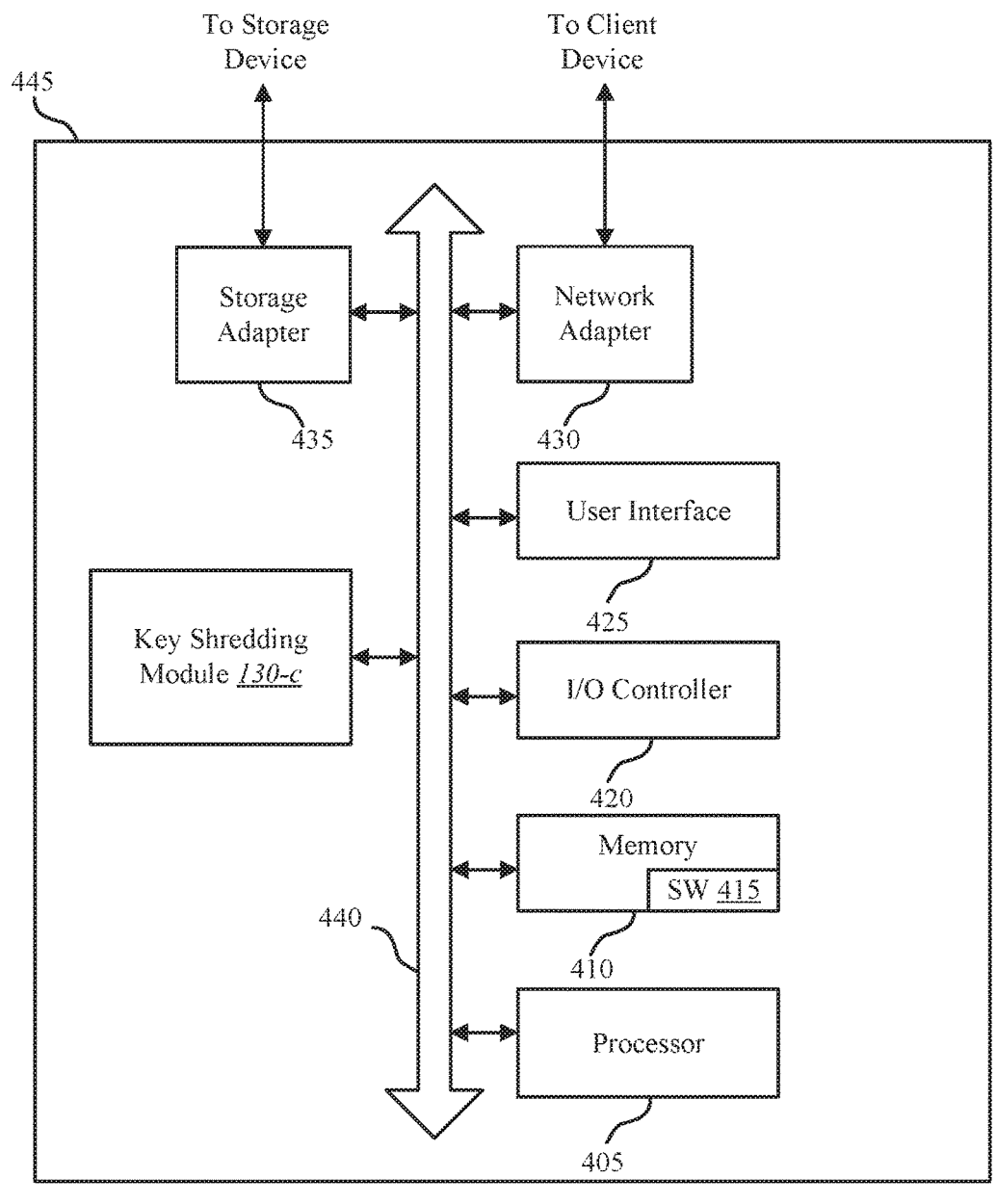
FIG. 4 shows a diagram of a system in accordance with various aspects of this disclosure.

FIG. 4 shows a system 400 for encryption key shredding to protect non-persistent data, in accordance with various examples. System 400 may include an apparatus 445, which may be an example of any one of device 105 of FIG. 1 and/or device 205 of FIG. 2.

Apparatus 445 may include components for bi-directional voice and data communications including components for transmitting communications and components for receiving communications. For example, apparatus 445 may communicate bi-directionally with one or more storage devices and/or client systems. This bi-directional communication may be direct (apparatus 445 communicating directly with a storage system, for example) and/or indirect (apparatus 445 communicating indirectly with a client device through a server, for example).

Apparatus 445 may also include a processor module 405, and memory 410 (including software/firmware code (SW) 415), an input/output controller module 420, a user interface module 425, a network adapter 430, and a storage adapter 435. The software/firmware code 415 may be one example of a software application executing on apparatus 445. The network adapter 430 may communicate bi-directionally—via one or more wired links and/or wireless links—with one or more networks and/or client devices. In some embodiments, network adapter 430 may provide a direct connection to a client device via a direct network link to the Internet via a POP (point of presence). In some embodiments, network adapter 430 of apparatus 445 may provide a connection using wireless techniques, including digital cellular telephone connection, Cellular Digital Packet Data (CDPD) connection, digital satellite data connection, and/or another connection. The apparatus 445 may include a key shredding module 130-c, which may perform the functions described above for the key shredding module 130 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), or any combination thereof.

One or more buses 440 may allow data communication between one or more elements of apparatus 445 such as processor module 405, memory 410, I/O controller module 420, user interface module 425, network adapter 430, and storage adapter 435, or any combination thereof.

The memory 410 may include random access memory (RAM), read only memory (ROM), flash RAM, dynamic RAM (DRAM), synchronous DRAM (SDRAM), double data rate (DDR) RAM, other types of RAM, or any combination thereof. The memory 410 may store computer-readable, computer-executable software/firmware code 415 including instructions that, when executed, cause the processor module 405 to perform various functions described in this disclosure. Alternatively, the software/firmware code 415 may not be directly executable by the processor module 405 but may cause a computer (when compiled and executed, for example) to perform functions described herein. Alternatively, the computer-readable, computer-executable software/firmware code 415 may not be directly executable by the processor module 405, but may be configured to cause a computer, when compiled and executed, to perform functions described herein. The processor module 405 may include an intelligent hardware device, for example, a central processing unit (CPU), a microcontroller, an application-specific integrated circuit (ASIC), or any combination thereof.

In some embodiments, the memory 410 may contain, among other things, the Basic Input-Output system (BIOS) which may control basic hardware and/or software operation such as the interaction with peripheral components or devices. For example, at least a portion of the key shredding module 130-c to implement the present systems and methods may be stored within the system memory 410. Applications resident with system 400 may be stored on and accessed via a non-transitory computer readable medium, such as a hard disk drive or other storage medium. Additionally, applications can be in the form of electronic signals modulated in accordance with the application and data communication technology when accessed via a network interface such as network adapter 430.

Many other devices and/or subsystems may be connected to one or may be included as one or more elements of system 400 (for example, a personal computing device, mobile computing device, smart phone, server, internet-connected device, cell radio module, or any combination thereof). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 445 with the ability to communicate with client devices such as device 105 of FIG. 1, and/or other devices over a network. Network adapter 430 may provide wired and/or wireless network connections. In some cases, network adapter 430 may include an Ethernet adapter or Fibre Channel adapter. Storage adapter 435 may enable apparatus 445 to access one or more data storage devices such as storage device 110. The one or more data storage devices may include two or more data tiers each. The storage adapter may include one or more of an Ethernet adapter, a Fibre Channel adapter, Fibre Channel Protocol (FCP) adapter, a SCSI adapter, and iSCSI protocol adapter.

Figure 5:
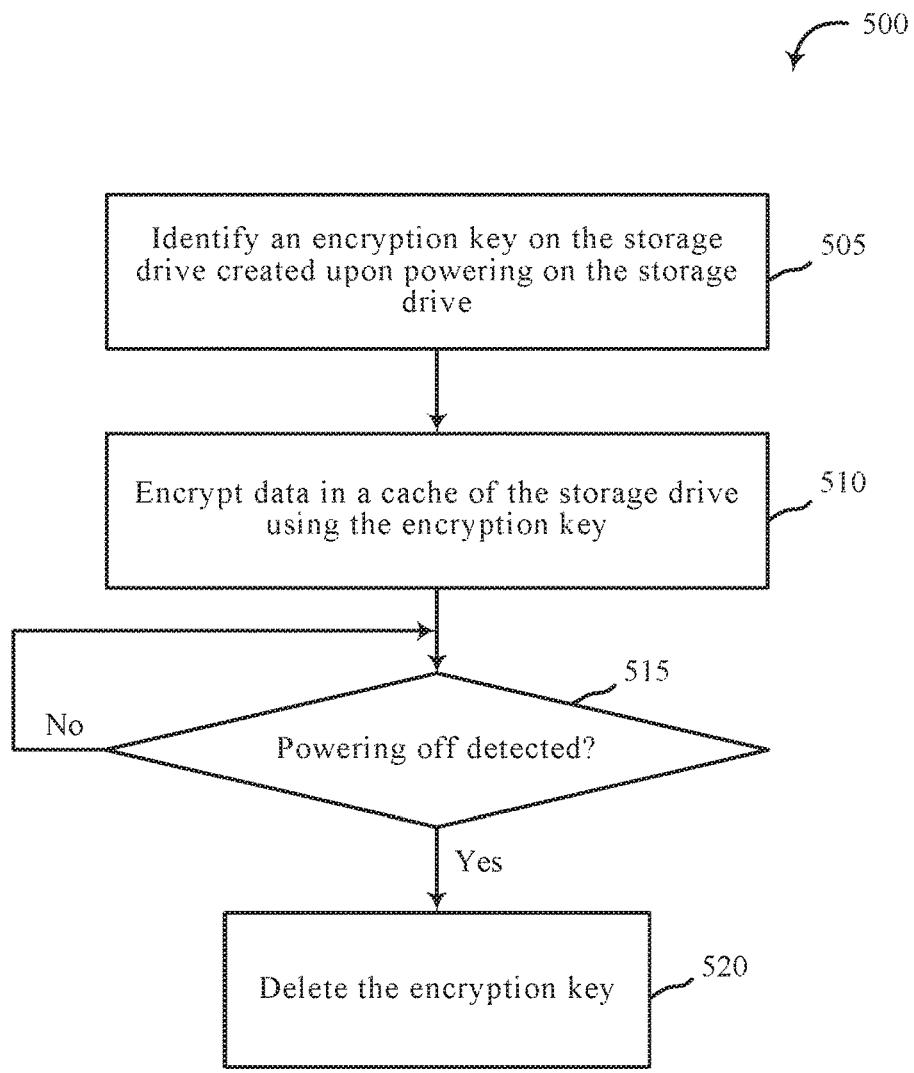
FIG. 5 is a flow chart illustrating an example of a method in accordance with various aspects of this disclosure.

FIG. 5 is a flow chart illustrating an example of a method 500 for encryption key shredding to protect non-persistent data, in accordance with various aspects of the present disclosure. One or more aspects of the method 500 may be implemented in conjunction with device 105 of FIG. 1, apparatus 205 of FIG. 2, and/or key shredding module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 505, method 500 may include identifying an encryption key on the storage drive created upon powering on the storage drive. At block 510, method 500 may include encrypting data in a cache of the storage drive using the encryption key. At block 515, method 500 may include determining whether a powering off of the storage drive is detected. If a powering off of the storage drive is detected, at block 520, method 500 may include deleting the encryption key before powering off the storage drive. Otherwise, method 500 may continue monitoring at block 515 to determine whether the storage drive is in process of powering off.

The operation(s) at block 505-520 may be performed using the key shredding module 130 described with reference to FIGS. 1-4 and/or another module. Thus, the method 500 may provide for encryption key shredding to protect non-persistent data relating to encryption key shredding to protect non-persistent data. It should be noted that the method 500 is just one implementation and that the operations of the method 500 may be rearranged, omitted, and/or otherwise modified such that other implementations are possible and contemplated.

Figure 6:
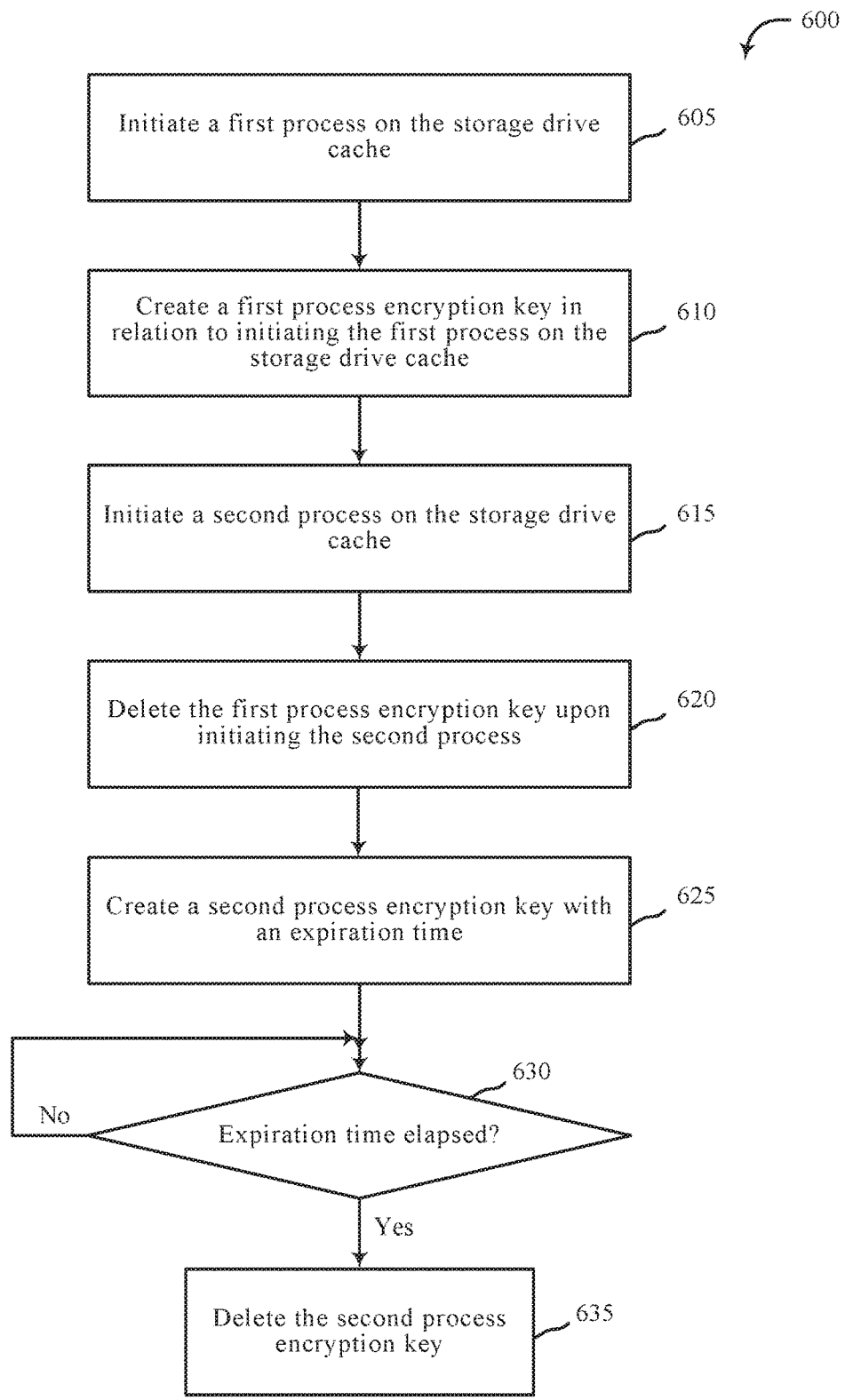
FIG. 6 is a flow chart illustrating an example of a method in accordance with various aspects of this disclosure.

FIG. 6 is a flow chart illustrating an example of a method 600 for encryption key shredding to protect non-persistent data, in accordance with various aspects of the present disclosure. One or more aspects of the method 600 may be implemented in conjunction with device 105 of FIG. 1, apparatus 205 of FIG. 2, and/or key shredding module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, method 600 may include initiating a first process on the storage drive cache. At block 610, method 600 may include creating a first process encryption key in relation to initiating the first process on the storage drive cache. At block 615, method 600 may include initiating a second process on the storage drive cache. At block 620, method 600 may include deleting the first process encryption key upon initiating the second process. At block 625, method 600 may include creating a second process encryption key with an expiration time. Method 600 may designate the expiration time for the encryption key. At block 630, method 600 may include determining whether the expiration time elapsed. If the expiration time has not elapsed, method 600 may continue monitoring to determine whether the expiration time has been reached. Otherwise, at block 635, method 600 may include deleting the second process encryption key based on the determination at block 630 that the expiration time elapsed. In some cases, method 600 may include deleting the second process encryption key upon determining a third process has been initiated. Thus, in some embodiments, method 600 may monitor for the expiration time of the second process encryption key as well as monitor to determine whether a third process is initiated after the second process, and may delete the second process encryption key upon determining the expiration time has been reached, or may delete the second process expiration key upon determining a third process has been initiated even if the expiration time has not been reached.

The operations at blocks 605-635 may be performed using the key shredding module 130 described with reference to FIGS. 1-4 and/or another module. Thus, the method 600 may provide for encryption key shredding to protect non-persistent data relating to encryption key shredding to protect non-persistent data. It should be noted that the method 600 is just one implementation and that the operations of the method 600 may be rearranged, omitted, and/or otherwise modified such that other implementations are possible and contemplated.

In some examples, aspects from two or more of the methods 500 and 600 may be combined and/or separated. It should be noted that the methods 500 and 600 are just example implementations, and that the operations of the methods 500 and 600 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, for example, a combination of a DSP and a microprocessor, multiple microprocessors, one or more microprocessors in conjunction with a DSP core, and/or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, or wireless technologies such as infrared, radio, and/or microwave are included in the definition of medium. Disk and disc, as used herein, include any combination of compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage system comprising:
   a storage drive; and
   a controller to:
   power on the storage drive;
   identify an encryption key on the storage drive created upon powering on the storage drive;
   encrypt data in a cache of the storage drive using the encryption key;
   power off the storage drive; and
   delete the encryption key upon powering off the storage drive.

2. The storage system of claim 1, comprising the controller to:
   receive the encryption key from a host of the storage drive, the host creating the encryption key upon powering on the storage drive and sending the encryption key to the storage drive.

3. The storage system of claim 1, comprising the controller to:
   create the encryption key on the storage drive, the storage drive being configured via the host to create the encryption key upon powering on the storage drive.

4. The storage system of claim 1, comprising the controller to:
   delete the encryption key upon resetting the storage drive, the resetting of the storage drive including at least one of power cycling the storage drive, reinitializing firmware on the storage drive, and reinitializing a software process on the storage drive.

5. The storage system of claim 1, comprising the controller to:
   initiate a first process on the storage drive cache; and
   create a first process encryption key upon initiating the first process on the storage drive cache.

6. The storage system of claim 5, comprising the controller to:
   initiate a second process on the storage drive cache;
   create a second process encryption key; and
   delete the first process encryption key upon initiating the second process.

7. The storage system of claim 6, at least one of the first process and the second process including a process initialized by the host, the process initialized by the host including the host writing data to the storage drive cache.

8. The storage system of claim 1, comprising the controller to:
   designate a time of expiration for an expiring encryption key associated with data saved to the storage drive cache.

9. The storage system of claim 8, comprising the controller to:
   identify a lapsing of the expiration time; and
   delete the expiring encryption key upon identifying the lapsing of the expiration time.

10. The storage system of claim 1, the storage drive including at least one of a solid state drive and a hard disk drive.

11. An apparatus comprising:
    a controller to:
    power on an apparatus;
    identify an encryption key on the apparatus created upon powering on the apparatus;
    encrypt data in a cache of the apparatus using the encryption key;
    power off the apparatus; and
    delete the encryption key upon powering off the apparatus.

12. The apparatus of claim 11, comprising the controller to:
    receive the encryption key from a host of the apparatus, the host creating the encryption key upon powering on the apparatus and sending the encryption key to the apparatus.

13. The apparatus of claim 11, comprising the controller to:
    create the encryption key on the apparatus, the apparatus being configured via the host to create the encryption key upon powering on the apparatus.

14. The apparatus of claim 11, comprising the controller to:
    delete the encryption key upon resetting the apparatus, the resetting of the apparatus including at least one of power cycling the apparatus, reinitializing firmware on the apparatus, and reinitializing a software process on the apparatus.

15. The apparatus of claim 11, comprising the controller to:
    initiate a first process on the apparatus cache; and
    create a first process encryption key upon initiating the first process on the apparatus cache.

16. The apparatus of claim 15, comprising the controller to:
    initiate a second process on the apparatus cache;
    create a second process encryption key; and
    delete the first process encryption key upon initiating the second process.

17. The apparatus of claim 16, at least one of the first process and the second process including a process initialized by the host, the process initialized by the host including the host writing data to the apparatus cache.

18. The apparatus of claim 11, comprising the controller to:
    designate a time of expiration for an expiring encryption key associated with data saved to the apparatus cache;
    identify a lapsing of the expiration time; and
    delete the expiring encryption key upon identifying the lapsing of the expiration time.

19. A method comprising:
    powering on a storage drive, the storage drive including at least one of a solid state drive and a hard disk drive;
    identifying an encryption key on the storage drive created upon powering on the storage drive;
    encrypting data in a cache of the storage drive using the encryption key;
    powering off the storage drive; and
    deleting the encryption key upon powering off the storage drive.

20. The method of claim 19, comprising:
    receiving the encryption key from a host of the storage drive, the host creating the encryption key upon powering on the storage drive and sending the encryption key to the storage drive.

* * * * *